Sept. 30, 1958 J. H. MacNEILL 2,854,197

IDLER WHEEL FOR TAPE DRIVE MECHANISMS

Filed June 8, 1955 2 Sheets-Sheet 1

INVENTOR.
John H. Mac Neill
BY
Howard L. Rose
Attorney

INVENTOR.
John H. MacNeill
BY Howard L. Rose
Attorney

United States Patent Office 2,854,197

Patented Sept. 30, 1958

2,854,197

IDLER WHEEL FOR TAPE DRIVE MECHANISMS

John H. MacNeill, Melbourne, Fla., assignor to Soroban Engineering, Inc., Melbourne, Fla., a corporation of Florida Application June 8, 1955, Serial No. 513,959

7 Claims. (Cl. 242—55.12)

The present invention relates to tape transport mechanisms and more particularly to transport mechanisms capable of rapidly accelerating long lengths of tape-like material.

The tape acceleration obtainable with a particular tape transport mechanism is determined by the force available to drive the tape during an acceleration interval. In the tape transport mechanism to which the present invention is particularly applicable high tape accelerations are obtained by isolating the apparatus for accelerating the tape from the high inertia components of the system so that a large percentage of the driving force is available for tape acceleration. In such a mechanism the tape which is stored on a high inertia supply spool is fed through a first low inertia tape loop defining and sensing mechanism, over a drive capstan which may be accelerated at a very high rate, through a second low inertia tape loop defining and sensing mechanism and thence to a high inertia take-up spool. The low inertia mechanisms are employed to effectively isolate the drive capstan from the high inertia take-up and supply spools so that none of the force developed by the drive capstan must be utilized for accelerating the high inertia spools. Since the force developed by the drive capstan is made unavailable for accelerating the spools, servo systems are employed for this purpose. The servo systems are controlled by the low inertia loop defining and sensing mechanisms which during acceleration of tape sense movement thereof and energize the servo systems which in turn accelerate the high inertia spools. Therefore, in such a system the force developed by the drive capstan need only accelerate the tape and the low inertia mechanisms.

The tape sensing apparatus incorporated in the low inertia mechanisms has taken various forms in prior art tape drive apparatus. Apparatus commonly employed for sensing the tape includes photocells, bins in which the quantity of air flow therethrough provides a measure of tape loop length and idler-equipped, movable arms having an electrical pick-up which senses the arm position. In the latter form of tape sensing apparatus the tape from a supply reel passes over an idler wheel and thence over a drive capstan, around a second idler wheel to a take-up spool. Each idler wheel may be rotatably mounted on an idler arm, the position of the idler wheel and arm with respect to the supply or take-up reel and the drive capstan being such as to determine a loop of tape of predetermined length. The idler arm may be so mounted as to rotate about an axis at one end in one direction in response to a decrease in the length of tape in the loop and to rotate in the other direction in response to an increase in the length of tape in the loop. An electrical pick-up; for instance, a potentiometer having its slider mechanically coupled to the idler arm, may be provided for sensing the amount and sense of rotation of the idler arm. The electrical pick-up controls a servo system to vary the speed of the supply or take-up reel to thereby maintain the length of the tape in the loop at a desired length.

As previously pointed out, the mechanism for defining the tape loop and for sensing the length of tape in the loop must have a low inertia in order to serve its function of effectively isolating the drive capstan from the inertia of the supply and take-up reels. The term "low inertia" is a relative term and a mechanism which may be considered as having low inertia for one system may be considered as having a high inertia in another system. Thus idler wheel and arm assemblies, as presently constituted, have sufficiently low inertias to be employed in a system where the tape is accelerated from stand-still to, say, 60 inches per second in one-fifth of a second. On the other hand, the inertia of the idler wheel and arm assembly as it is presently constituted is unacceptably high in a system which accelerates the tape from standstill to, say, 300 inches per second in one-quarter of a millisecond.

It is an object of the present invention to provide a substantially inertialess idler wheel and arm assembly for tape drive mechanisms.

It is another object of the present invention to provide a simple and highly effective means for reducing the inertia of idler wheel and arm assemblies employed in tape drive mechanisms.

Another object of the present invention is to provide a tape transport mechanism wherein substantially all of the power developed by the drive capstan is initially available for tape acceleration.

Yet another object of the present invention is to provide a tape transport mechanism employing a drive capstan and an idler wheel and arm mechanism wherein substantially all of the power of the drive capstan is initially available for tape acceleration.

Still another object of the present invention is to provide a tape transport mechanism employing a drive capstan and a tape loop defining and sensing idler wheel and arm assembly, wherein the idler arm and wheel assembly is accelerated only after the tape has reached full speed.

The inertia introduced into the tape drive mechanism by the idler wheel and arm assembly is principally attributable to the rotational inertia of the idler wheel about its own axis of rotation and the rotational inertia of the idler wheel and arm about the rotational axis of the idler arm. In accordance with the present invention both of these principal inertias and all other inertias existing in the idler wheel and arm assembly may be substantially eliminated during tape acceleration by providing a highly resilient covering or tire for the idler wheel.

Upon initial acceleration of the tape, the resilient covering on the idler wheel is deformed by compression and as a result a length of tape equal to approximately twice the deformation of the covering is made available to the capstan for acceleration thereby. Substantially all of the force developed by the drive capstan, except for the negligible force necessary to deform the resilient covering on the idler wheel, is available for tape acceleration and, therefore, very high rates of tape acceleration are obtainable. After the tape made available to the capstan has been accelerated to terminal velocity all of the force developed by the capstan, except that necessary to overcome frictional forces, is available for accelerating the idler wheel and idler arm, this acceleration being aided by the resilient covering being restored to its non-deformed configuration as a result of its inherent elasticity. Movement of the idler arm actuates the servo systems which bring the supply and take-up spools up to full speed. Thus the force provided by the capstan is first employed to accelerate the tape after which the force is available to accelerate the idler wheel and arm to an "error signal" position for controlling the servo system.

An indication of the effectiveness of the present invention in isolating the drive capstan from the inertia of the idler wheel and arm may be obtained by comparing the time necessary to accelerate a tape to a given velocity by a prior art mechanism with that necessary for accelerating the tape to the same velocity by the mechanism of the present invention.

Assume that a prior art idler mechanism has a total inertia of only three grams, that it is desired to accelerate the tape to a terminal velocity of 300 inches per second and that the capstan develops a force of two pounds on the tape. Assuming further that the tape is inertialess and, therefore, the two pound force developed by the capstan is available to accelerate the idler assembly, then a four pound force is exerted on the idler since the tape on either side of the idler exerts a two pound force thereon. The time necessary for accelerating the idler assembly and, therefore, the tape to full speed is $$t=\frac{V}{a}=\frac{V_{im}}{FK}$$

$$t=\frac{150\times 3}{4\times 453\times 32.2\times 12}$$

and $$t=.64 \text{ milliseconds}$$

where $K=453\times 32.2\times 12$ is a conversion factor and $V_i=150$ is the velocity of the idler assembly in inches per second. Therefore, with this system it requires 0.64 millisecond to accelerate the tape to a speed of 300 in./sec.

In analyzing the mechanism of the present invention it is assumed that the mass of the idler wheel and arm assembly is 10 grams, that the mass of the tape to be accelerated is 0.3 gram and that initially all of the energy of the capstan is available for accelerating the tape. Then $$t=\frac{V_{tm}}{FK}=\frac{300\times 0.3}{2\times 453\times 32.2\times 12}=0.25 \text{ milliseconds}$$

where $V_t$ is the velocity of the tape in inches per second.

During this interval the tape is displaced 0.039 inch and as a result the idler wheel tire is deflected approximately 0.02 inch. Thus if negligible force with respect to the two pound force is required to compress the tire 0.02 inch, the mechanism of the present invention permits the capstan to accelerate the tape to 300 inches per second in almost a third of the time necessary for the prior art mechanism analyzed above.

The force necessary to compress the idler tire is determined by the elastic properties of the tire and the area of contact between the tape and the tire. Assuming that the tire is made of sponge rubber, the pressure necessary to compress the tire one inch is sixty-four p. s. i., this being a standard value for sponge rubber. Assuming further that the area of contact between the sponge rubber and the tape is ¼″×¾″ then the force necessary to deform the tire is $$F=PXA$$
$$=64 \text{ p. s. i./in.}\times .02''\times 1/4''\times 3/4''=0.23 \text{ lbs.}$$

This force, however, is that necessary to deform the tire a maximum amount at the end of the acceleration interval. At the instant that acceleration of the tape commences no force is required since the tire is not deformed, and, therefore, the average force necessary to deform the tire over the acceleration interval is half the final force or 0.12 lb. Further, due to the fact that the tape is looped around the idler wheel providing a block and tackle arrangement, the force that must be applied by the drive capstan is only half the average force or 0.06 lb., a figure which is negligible with respect to the two pound force supplied by the capstan. Therefore, the addition of a resilient tire to the idler wheel increases the obtainable acceleration by a factor of approximately three over that obtainable with the prior art mechanism. Once the tape has been accelerated the full two pound force, less small friction losses, is available to accelerate the idler mechanism which controls the servo systems to bring the reels up to speed.

The present invention has thus far been described as applicable to an idler mechanism, wherein a different idler wheel is employed on each side of the drive capstan, and wherein two idler arms, each having one idler wheel mounted thereon, is each rotatable about one of its ends. It is not intended to limit the invention to this specific idler mechanism since the invention is equally applicable to mechanisms employing a number of idler wheels and employing a plurality of idler arms or a single idler arm adapted for translatory motion. An example of a tape drive system to which the present invention is applicable is disclosed in U. S. Patent No. 2,656,129 for High-Speed Tape Handling Mechanism issued to John H. MacNeill and John E. De Turk.

It is an object of the present invention to provide a low inertia tape loop defining and tape sensing idler wheel mechanism for tape drive mechanisms, wherein the inertia of the idler mechanism is effectively eliminated during tape acceleration by providing a resilient tire for the idler wheels in the idler mechanism.

It is another object of the present invention to provide an idler wheel and arm mechanism for tape drive mechanisms for isolating a drive capstan from the tape supply and take-up reels, wherein the capstan is effectively isolated from the idler mechanism during tape acceleration by providing the idler wheels thereof with resilient tires.

In the embodiment of the invention thus far described the drive capstan is effectively isolated, during the acceleration interval, from the inertia of both the idler wheel and idler arm. Where it is not necessary to obtain the high accelerations provided by such a mechanism it may be desirable merely to isolate the capstan from the inertia of the idler arm. This may be accomplished by resiliently mounting the idler wheel on the idler arm as by a leaf spring or other suitable arrangement. With such an arrangement the capstan is subject only to the inertia of the idler wheel and, therefore, permits higher accelerations than obtainable with the prior art mechanisms where the capstan is subject to inertia of both the idler wheel and arm.

It is, therefore, another object of the present invention to provide a tape drive mechanism having a drive capstan and low inertia tape loop defining and sensing idler assemblies for isolating the capstan from the high inertia of the supply and take-up spools, wherein a resilient member is provided for isolating the capstan from the inertia of the idler assemblies or elements thereof during tape acceleration.

It will be noted that in the first embodiment of the present invention, the resilient tire provides a first length of tape for acceleration by the capstan after which the low inertia mechanism provides a second length of tape for acceleration by the capstan. In other words the present invention provides during acceleration of the tape, cascaded tape supplies which as a result of the force developed by the capstan sequentially supply tape to the capstan for acceleration thereby. Although in the first embodiment of the invention only two cascaded supplies are provided, the invention is not limited thereto. An idler wheel having a resilient tire and mounted on a leaf spring, as in the second embodiment of the invention, provides a cascaded system having three stages since tape is first supplied by deformation of the tire, thence from bending of the spring and finally by displacement of the idler arm.

It is, therefore, another object of the present invention to provide a cascaded tape supply system.

Another object of the present invention is to provide, during tape acceleration, a cascaded supply system, wherein tape is sequentially and successively fed from the cascaded supply system.

Although the present invention is applicable to all tape drive mechanisms, it is particularly applicable to magnetic tape recording and reproducing systems.

The above and still further features, objects, and advantages of the present invention will become apparent upon consideration of the following detailed description of a specific embodiment of the invention, especially when taken in conjunction with the accompanying drawings, wherein.

Figures 1, 2, 3:
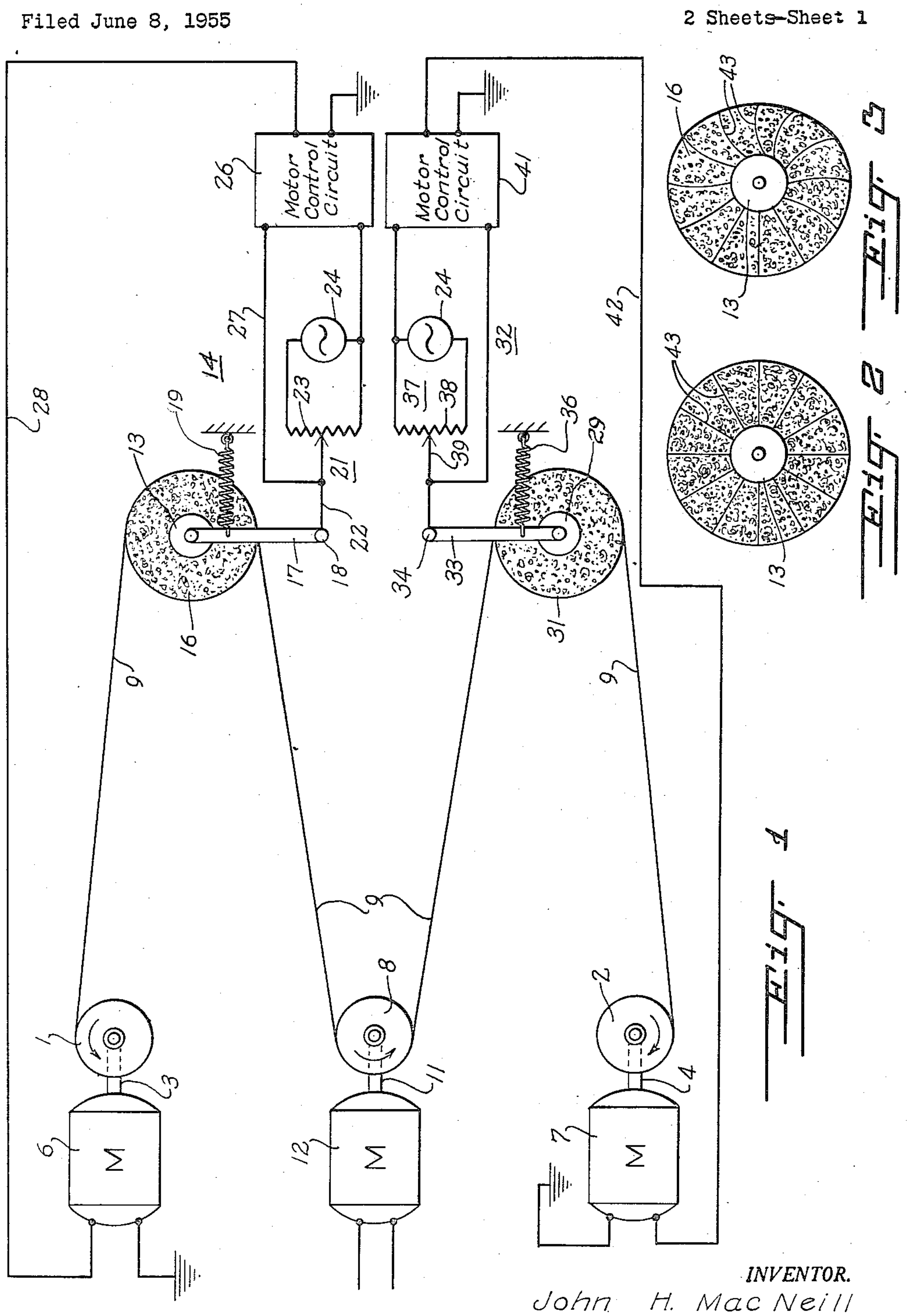
Figure 1 illustrates the preferred embodiment of a tape drive mechanism employing the substantially inertialess idler assembly of the present invention.
Figures 2 and 3 are cross sectional views of a foam rubber covered idler wheel taken during various stages of the operation of the apparatus.

Referring to Figure 1 of the accompanying drawings, there is provided a first reel 1, which for the sake of convenience is hereinafter called the supply reel and a second reel 2 hereinafter referred to as the take-up reel. The reels 1 and 2 are supported on rotatable shafts 3 and 4, respectively, which are rotatably driven by the motors 6 and 7, respectively. A capstan 8, for driving a tape 9 is supported on rotatable shaft 11 which may be rotated by a motor 12.

There is further provided a first idler wheel 13 which forms one element of a first low inertia, tape loop defining and tape length sensing mechanism 14. The idler wheel 13 is provided with a resilient tire 16 to isolate substantially the capstan 8 from the inertia of the mechanism 14 in a manner to be hereinafter described. The idler wheel is rotatably mounted on one end of an idler arm 17, which arm is rotatably mounted at its other end on a shaft 18. A spring 19 secured to the arm 17 is employed to urge the arm 17 to rotate clockwise about the shaft 18. A potentiometer 21 is provided with a rotatable slider 22 which is adapted to slidably engage a resistance element 23. The slider 22 is mechanically coupled to the lower end of the arm 17 and is rotated therewith. The resistor 23 is connected across a source of A. C. voltage 24 and one end of the resistor 23 is connected to a first input terminal of a motor control circuit 26. A second input terminal of the motor control circuit 26 is connected over lead 27 to the slider 22 of the potentiometer 21. The output voltage from the amplifier 26 is connected over lead 28 to the motor 6.

A second idler wheel 29, having a resilient tire 31, forms one element of a second low inertia tape loop defining and tape length sensing mechanism 32. The idler wheel 29 is rotatably mounted on one end of an idler arm 33, the other end of which is rotatably secured to a shaft 34. A spring 36 biases the idler arm 33 for rotation about the shaft 34 in a counterclockwise direction. A potentiometer 37, comprising a resistor 38 and a slider 39 that slidably engages the resistance 38 has its resistor 38 connected across an A. C. source 24.

A first input terminal of a motor control circuit 41 is connected to one end of resistor 38, and the slider 39 of potentiometer 37 is electrically connected to a second input terminal of the motor control circuit 41 and is mechanically coupled to the idler arm 33 for rotation therewith. The motor control circuit 41 is connected over lead 42 to the motor 7 for control thereof. The motor control circuits 26 and 41 form no part of the present invention, and, therefore, are shown in block form. Motor control circuits of the type employed in the present invention are well known in the art, and, for example, they may be identical to those employed in the aforementioned U. S. Patent No. 2,656,129.

The tape 9 which is stored on the reels 1 and 2 is fed from the reel 1 over the idler wheel 13, around the capstan 8, over the idler wheel 29 and to the take-up reel 2. The idler wheel 13 is disposed with respect to the drive capstan 8 and the supply reel 1 so as to define a loop of tape of a predetermined length between the supply reel 1 and the capstan 8. The axis of rotation of the idler arm 17 is arranged such that in response to shortening and lengthening of the tape 9, in the loop defined by the idler wheel 13, the arm 17 is rotated counterclockwise and clockwise, respectively. The positioning and arrangement of the idler wheel 29 and other elements of the mechanism 32 with respect to the drive capstan 8 and take-up reel 2 are identical with the positioning and arrangement of the elements of the mechanism 14 with respect to the supply reel 1 and capstan 8. Therefore, the idler wheel 29 defines a loop of tape 9 between the capstan 8 and take-up reel 2 and the idler wheel 29 rotates clockwise and counterclockwise in response to a shortening and lengthening, respectively, of the tape 9 in the loop.

The motor control circuits 26 and 41 are so adjusted that the motors 6 and 7 apply torques in opposite directions to the reels 1 and 2, respectively. Also, when the potentiometer sliders 22 and 39 are centered on their associated resistors 23 and 38 and the drive capstan 8 is at stand-still, the torques applied to the reels 1 and 2 and through the tape 9 to the idler arms 17 and 33 are such that they balance out the torques applied to the idler arms 17 and 37 by the springs 19 and 36, respectively.

Initially, the operation of the apparatus illustrated in Figure 1 is described as if the tires 16 and 31 have not been provided; that is, the prior art mechanism is first described.

Upon acceleration of the capstan 8 in a counterclockwise direction, for instance, an amount of tape 9 is removed from the loop defined by the idler wheel 13 and the same amount of tape is supplied to the loop defined by the idler wheel 29. As a result, the idler arm 17 is rotated counterclockwise and the idler arm 33 is rotated clockwise. Counterclockwise rotation of the idler arm 17 rotates the slider 22 of the potentiometer 21 and changes its position on the resistance 23, thereby changing the A. C. input signal to the motor control circuit 26. In response to the change in input signal the motor control circuit 26 causes the motor 6 to drive the supply reel 1 to feed tape. Similarly, clockwise rotation of the idler arm 33 rotates the slider 39 over the resistance 38 and varies the A. C. input signal to the motor control circuit 41 which causes the motor 7 to drive the reel 2 to take-up tape. The motors 6 and 7 are capable of being accelerated at a sufficiently high rate to bring them up to operating speeds before the capstan 8 displaces a length of tape 9 equal to the length of tape in the loops provided by the idler wheels 13 and 29. Therefore, the only force to which the tape 9 is subjected during the acceleration of the capstan 8 is the force necessary to initiate rotation of the idler wheel 13 and the the idler arm 17. As a result, the drive capstan 8 is effectively isolated from the inertia of the supply reel 1 and is subjected only to the rotational inertia of the idler wheel 13 about its axis and the rotational inertia of the idler arm 17 about shaft 18. The rotational inertia of the idler arm 17 is attributable to several factors such as the combined inertia of the idler arm 17 and the idler wheel 13 about the shaft 18, the inertia of the spring 19 and the inertia of the slider 22 of the potentiometer 21. Although the inertia force thus introduced into the tape drive mechanism is quite low, only three grams for the mechanism of the aforementioned U. S. Patent 2,656,129 it is sufficiently large to limit tape accelerations to a value less than may be desirable in specific applications of the mechanism.

In accordance with the present invention the capstan 8 may be effectively isolated from the inertia of the mechanisms 14 and 32 by means of the resilient tires 16 and 31 provided on the idler wheels 13 and 29, respectively.

Referring to Figure 2 of the accompanying drawings, there is illustrated an idler wheel 13 having a resilient tire 16, the lines 43 denoting lines of force in the tire 16 when no deforming force is applied thereto. Such a conditions exists prior to acceleration of the drive capstan 8. Upon rapid acceleration of the drive capstan 8, tape is removed from the loop defined by the idler wheel 13 before the mechanism 14 is capable of responding to the forces applied thereto by the tape 9. More specifically, the commencement of rotation of the idler wheel 13 about its own axis and the idler arm 17 about shaft 18 lag behind the commencement of tape movement in response to acceleration of the capstan 8. As a result, the length of tape 9 in the loop defined by idler wheel 13 is shortened and the tire 16 is deformed. The deformation of the tire 16 occurs in two planes, the deformation in each plane resulting from different rotational effects.

Referring to Figure 3 of the accompanying drawings, there is illustrated a covered idler wheel 13 at an instant after commencement of acceleration of the tape 9. The tape commences movement parallel to the circumference of the tire 16 causing rotation of the material of the tire 16, in contact with the tape 9, with respect to the initially stationary idler wheel 13. This is shown in Figure 3 by the curvature of the lines of force 43. Thus, instead of the tape 9 being subjected to the rotational inertia of the idler wheel 13 it is merely subjected to the internal tortional inertia of the of the foam rubber which is practically nil.

Movement of the tape 9 by the capstan 8 at the instant after acceleration reduces the length of tape in the loop defined by the idler wheel 13 and, as a result, radial forces directed toward the center of the idler wheel 13 are supplied to the circumference of the tire 16. Due to its inertia the idler arm 17 initially remains stationary and the tire 16 is compressed between the tape 9 and the idler wheel 13. Compressional deformation of the tire 16 is illustrated in Figure 3 by the shortened lines of force 43. Thus, instead of the tape 9 being subjected to the rotational inertia of the idler arm 17 it is merely subjected to the internal compressional inertia of the foam rubber tire 16 which is substantially less than the inertia of the idler arm. In fact, as previously pointed out, if the tires 16 and 31 are fabricated from sponge rubber the inertia force seen by the capstan is only 0.06 lb. Therefore, by providing the idler wheels 14 and 29 with the tires 16 and 31, tape accelerations obtainable with prior art tape drive mechanisms may be increased by a factor of almost 3.

Although the tires 16 and 31 are illustrated in Figure 1 as being quite large in order to emphasize the novel features of the present invention the tires need be no more than one-quarter of an inch thick.

Figure 4:
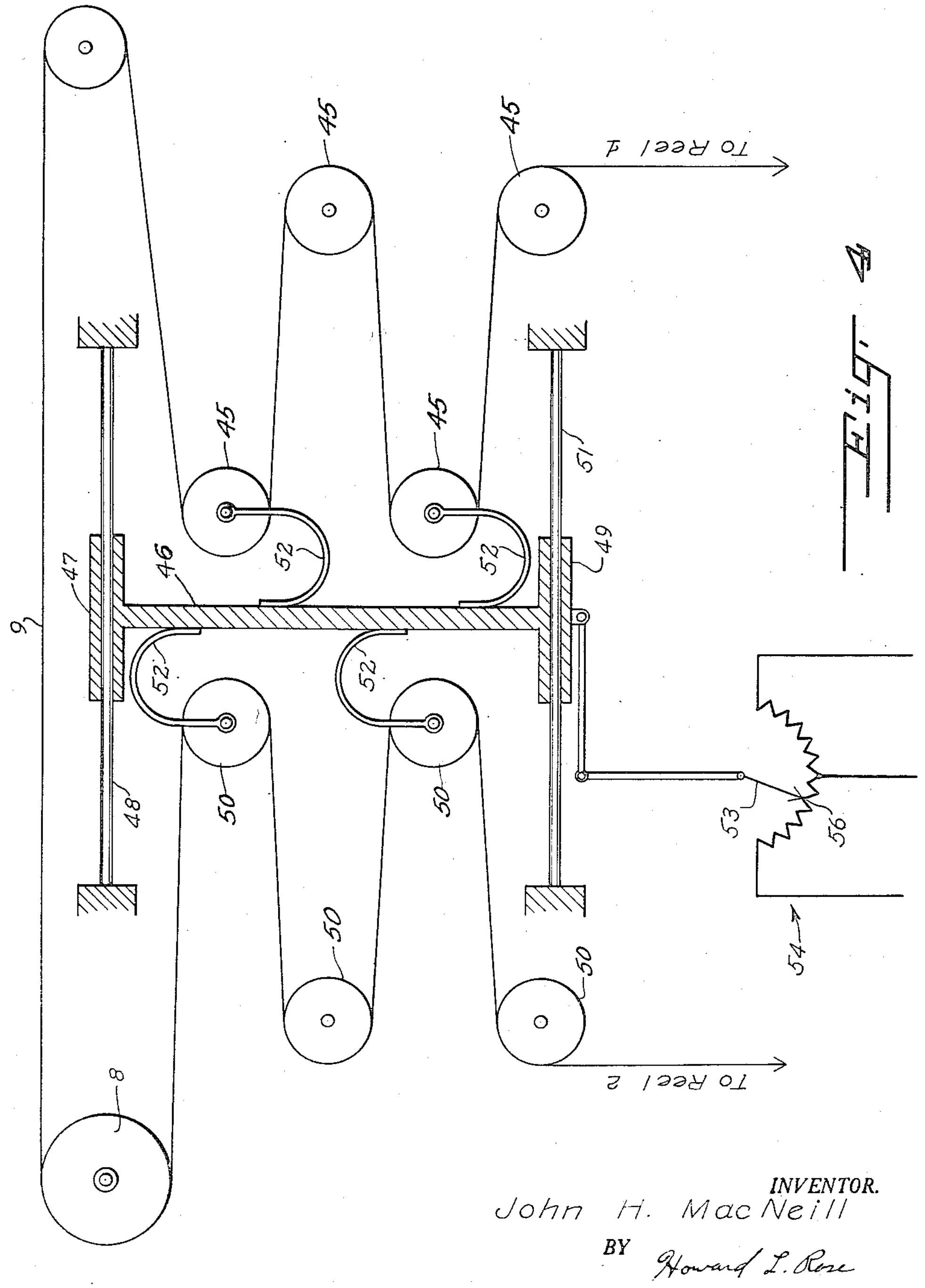
Figure 4 illustrates a second embodiment of the present invention.

The apparatus illustrated in Figure 1 of the accompanying drawings effectively isolates the capstan 8 from the inertia of both the idler wheels 13 and 29 and the idler arms 17 and 33. Referring to Figure 4 of the accompanying drawings, an embodiment of the present invention is illustrated in which the capstan 8 is isolated only from the inertia of the idler arm. The mechanism illustrated in Figure 4, except for the changes made in accordance with the present invention, is the same as that illustrated in the aforesaid U. S. Patent 2,656,129 and reference may be made to this patent for a detailed description of the operation of the system. In this embodiment of the present invention tape 9 is fed from reel 1, around a plurality of idler wheels 45, which are alternately arranged in parallel vertical columns, to provide a first block and tackle arrangement, around the drive capstan 8, over a plurality of idler wheels 50 to provide a second block and tackle arrangement and thence to the reel 2. A vertical idler arm 46, disposed between the idler wheels 45 and 50, is provided at one end with a first transverse tubular member 47 disposed about a first horizontal rod 48. Secured to the other end of the arm 46 is a second tubular member 49 disposed about a second horizontal rod 51. As a result of this method of mounting the arm 46, it is free to translate horizontally along the rods 48 and 51. Each of the idler wheels 45 and 50 closest to the arm 46 is rotatably supported on one end of a leaf spring 52, the other end of which is secured to the arm 46.

A slider 53 of a potentiometer 54 is mechanically coupled to the tubular member 49 and is adapted to vary its position along a resistor 56 of the potentiometer 54 in response to movement of the idler 46. The resistor 56 is suppled with A. C. and is connected in the motor control circuits 26 and 41.

Except for the changes introduced by the leaf spring mountings of some of the idlers 45 and 50 the operation of this mechanism is the same set forth in U. S. Patent 2,656,129. The change introduced by the leaf springs 52 is that upon acceleration of the tape by the capstan 8, assuming rotation in a counterclockwise direction, only the spring mounted idler wheels 45 and the tape 9 are initially accelerated while the idler arm 46 remains stationary. Only after the tape has reached terminal velocity is the idler arm 46 accelerated. Therefore, the capstan is effectively isolated from the inertia of the idler arm during tape acceleration. Although the apparatus of Figure 4 does not permit as high accelerations as the apparatus of Figure 1, it does have the advantage of affording some alignment stability of idler wheels 45 and 50 with the tape 9. This is, since the wheels are mounted on leaf springs they may follow sideward movement of the tape thereby reducing the usual alignment problem.

From the description of both the first and second embodiments of the invention it is apparent that the apparatus of the present invention provides a cascaded tape storage and supply system wherein a short length of tape is initially supplied from a first tape storage system, the resilient tire 16 or the leaf spring 52, to permit rapid acceleration of the tape 9. After the initial supply of tape is accelerated and deleted, the force developed by the drive capstan 8 is utilized to position an error sensing device, mechanism 14 of Figure 1 or the corresponding mechanism of Figure 4, which detects the length of tape still available; that is, stored between the reels 1 and 2 and the capstan 8 and at the same time supplies a second length of tape for acceleration by the capstan 8. Therefore, the present invention provides a cascaded tape supply apparatus in which tape is sequentially supplied from various stages of the system, the final stage also sensing tape movement and effecting acceleration of the reel servos 6 and 7. A three stage cascaded supply may be provided by spring mounting covered idler wheels. In such a system tape is supplied first by compression of the tire, second by bending of the spring and last, by movement of the tape sensing mechanism. The number of tape storage stages included in a particular cascaded supply mechanism may be varied to suit the requirements of a specific system and it is not intended to limit the number of stages utilized.

The operation of the apparatus of both Figures 1 and 4 has been described only for counterclockwise rotation of the capstan 8. However, if direction of rotation of the capstan is reversed the operation of the system is identical except that the functions of the idler wheels and their associated mechanisms are interchanged.

While I have described and illustrated two specific examples of the present invention it will be clear that variations of the specific details of construction may be resorted to without departing from the true spirit of the invention as defined in the appended claims.

What I claim is:

1. A tape drive mechanism comprising means for supplying a quantity of tape, driving means for said tape, means for storing a quantity of tape, means for defining a loop of tape between said means for supplying and said driving means and for defining a loop of tape between said driving means and said means for storing, said means for defining including means for isolating said driving means from said means for defining during acceleration and deceleration of the tape, said means for isolating comprising a plurality of idler wheels and a resilient tire disposed about the circumference of more than one of said idler wheels.

2. In a tape drive mechanism having means for supplying a quantity of tape, means for driving said tape and means for taking up said tape; a tape loop defining and tape length sensing means for isolating the means for driving from the means for supplying and the means for taking up tape, said tape loop defining and tape sensing means including resilient means for isolating the means for driving from the inertial forces of said sensing means during acceleration and deceleration of said tape, said resilient means being yieldable in response to acceleration and deceleration forces applied to the tape.

3. The combination in accordance with claim 2, wherein said tape loop defining and sensing means includes a rotatable idler wheel, means for supporting said idler wheel so that said idler wheel is caused to translate in response to changes in the length of said loop of tape and wherein said resilient means comprises a foam rubber tire disposed about the circumference of said idler wheel.

4. The combination in accordance with claim 2 wherein said tape loop defining and sensing mechanism comprises a plurality of idler wheels, and said resilient means comprises a resilient covering for at least one of said idler wheels.

5. The combination in accordance with claim 4 wherein said resilient means further includes a resilient arm means and means for rotatably mounting at least one of said idler wheels on said resilient arm means.

6. A tape transport mechanism comprising a first tape storage reel, a second tape storage reel and a drive capstan, a length of tape extending from said first reel over said drive capstan to said second reel, and cascaded tape storage and supply mechanisms having a number of stages for storing tape, the tape on each side of said drive capstan passing through a different one of said cascaded mechanisms, said cascaded mechanisms having resilient means for sequentially supplying tape from successive stages thereof during tape acceleration and deceleration, said resilient means being yieldable in response to a change in velocity of said tape.

7. The combination in accordance with claim 6 wherein said means for sequentially supplying tape from successive stages includes in one stage thereof idler wheel means and a resilient covering covering on said idler wheel means.

References Cited in the file of this patent

UNITED STATES PATENTS

| | | |
|---|---|---|
| 2,120,735 | Debrie | June 14, 1938 |
| 2,304,913 | Herzig | Dec. 15, 1942 |
| 2,568,431 | Congdon | Sept. 18, 1951 |
| 2,656,129 | De Turk et al. | Oct. 20, 1953 |
| 2,687,884 | Ward et al. | Aug. 31, 1954 |
| 2,708,554 | Welsh et al. | May 17, 1955 |
| 2,733,871 | Reinhold | Feb. 7, 1956 |